United States Patent [19]
Pottharst, Jr.

[11] 3,884,767
[45] May 20, 1975

[54] MULTI-EFFECT FLASH EVAPORATOR

[76] Inventor: John E. Pottharst, Jr., 861 Carondelet St., New Orleans, La. 70130

[22] Filed: Sept. 21, 1973

[21] Appl. No.: 399,375

[52] U.S. Cl............ 202/174; 159/17 R; 159/DIG. 8; 159/46; 203/11
[51] Int. Cl......... B01d 3/00; B01d 3/02; B01d 1/28; B01d 1/26; B01d 1/00
[58] Field of Search...... 202/173, 158, 174; 203/10, 203/11; 159/2 MS, DIG. 8, 2 R, 18, 17 R, 46

[56] References Cited
UNITED STATES PATENTS

| | | | |
|---|---|---|---|
| 1,935,709 | 11/1933 | Hall............................. | 202/158 UX |
| 2,191,919 | 2/1940 | Thayer........................ | 202/158 UX |
| 2,759,882 | 8/1956 | Worthen et al............. | 202/173 |
| 2,862,698 | 12/1958 | Howerton et al.......... | 202/158 X |
| 3,003,931 | 10/1961 | Worthen et al............. | 159/2 MS X |
| 3,160,571 | 12/1964 | Mulford et al.............. | 202/173 |
| 3,197,387 | 7/1965 | Lawrance................... | 202/173 |
| 3,259,552 | 7/1966 | Goeldner................... | 159/2 MS UX |
| 3,630,851 | 12/1971 | Kawaguchi et al......... | 202/173 |
| 3,647,638 | 3/1972 | Osdor.......................... | 159/18 X |

*Primary Examiner*—Jack Sofer
*Attorney, Agent, or Firm*—W. F. Hyer; Marvin B. Eickenroht

[57] ABSTRACT

A multi-effect flash evaporator is provided wherein preheated seawater is passed into a header extending at least partially across a vessel or compartment into which the preheated feed water is to be discharged for flashing. The header has a plurality of restricted discharge means such as orifices, pipe nipples, and the like, distributed along its length for discharge of the preheated seawater upwardly. A flash chamber is disposed along and generally above the discharge means and has downwardly extending sidewalls on both sides of the header to form flow passages therewith. The flash chamber is disposed at a level below that of the mist eliminator so that steam flowing down through the passages must substantially change its flow direction in order to pass upwardly to the mist eliminator.

5 Claims, 3 Drawing Figures

MULTI-EFFECT FLASH EVAPORATOR

This invention relates to a multi-effect flashing evaporator system of the type having a relatively high (e.g., 20° to 35° F.) temperature drop per stage during the flashdown. In another of its aspects, it relates to such a system having an improved arrangement for flashing down the seawater and separating the resulting flashed stream from the unflashed water.

In multiple effect flash evaporator systems having a relatively large temperature drop per stage, there is the problem of conducting the flashdown and the subsequent separation of the steam and unflashed water from each other to a satisfactory degree before the steam is passed to a mist eliminator for separation of entrained mist or droplets of water therefrom. Since flashing occurs instantaneously when the pressure is reduced, the steam vapor is generated at a very high rate with the rate being proportional to the degree of super heat. Thus, there is a vast difference in the problem encountered with a multi-stage system flashing only 3° to 10° F. per stage and a mulitple effect flash evaporating system which is flashing, for example, 20° to 35° F. per stage. In the latter, the steam is generated more or less through the discharge water stream and the effect of the release of the steam resembles that of a continuous "explosion." Thus drops and slugs of water of various sizes are blasted in all directions permitted by the enclosures. The problem then is to permit this rather violent release and expansion of the steam while at the same time causing the steam ultimately flowing to the mist eliminator to be devoid of excessive amounts of droplets or slugs of water.

It is an object of this invention to provide a multi-effect flash evaporator system wherein a large degree of flashdown per stage can be accomplished while effecting sufficient separation of the steam and unflashed water such that a mist eliminator is not excessively loaded with liquid and wherein steam is free to travel toward the mist eliminator without passing through the streams of superheated water being flashed.

Another object is to provide such a system in which the unflashed water falls downwardly into the body of water in the stage without any substantial flashing after it has reached such body of water thereby avoiding or reducing foaming problems and also so that the falling water will tend to break up any foam on the body of water.

Another object is to provide such a system in which the flashed steam and accompanying unflashed water is directed downwardly by the flashing device in such a manner that the water is directed to fall upon the body of water in the stage and the steam is caused to change its direction of travel substantially (e.g., about 180°) so as to cause further separation of water droplets therefrom by the action of inertia, gravity or centrifugal force.

Other objects, advantages and features of the invention will be apparent to one skilled in the art upon consideration of the specification, the claims and the drawings wherein:

In accordance with this invention, a multiflash evaporator system is provided wherein the heated seawater is flashed into a vessel or compartment to provide steam and unflashed water. a mist eliminator is situated in an upper portion of the vessel or compartment and an improved flashing and separation means if provided at a level below that of the mist eliminator. The flashing and separating means includes a preheated seawater inlet header extending at least partially across the vessel or compartment and including a plurality of upwardly directed restricted discharge means through which the preheated seawater is discharged for flashing. Means are also provided forming a flash chamber to receive this discharged seawater and this flash chamber extends generally along and above the discharge means and has sidewalls which extend downwardly on both sides of the header to form flow passages therewith. The arrangement is such that the violently flashing seawater is contained within the flash chamber and then the totality of the flashed steam and unflashed water is caused to flow downwardly to be discharged from the flashing and separating means into the vessel or compartment. The discharged water continues falling down into the body of the water in the bottom of the vessel or compartment while steam is caused to change its direction so as to further separate water droplets or slugs entrained therein by inertial, gravitational or centrifugal action. Thus the steam flows upwardly from the discharge to the mist eliminator out of contact with the flashing mixture in the flash chamber thereby avoiding the steam picking up droplets of water during its journey to the mist eliminator.

Figure 1:
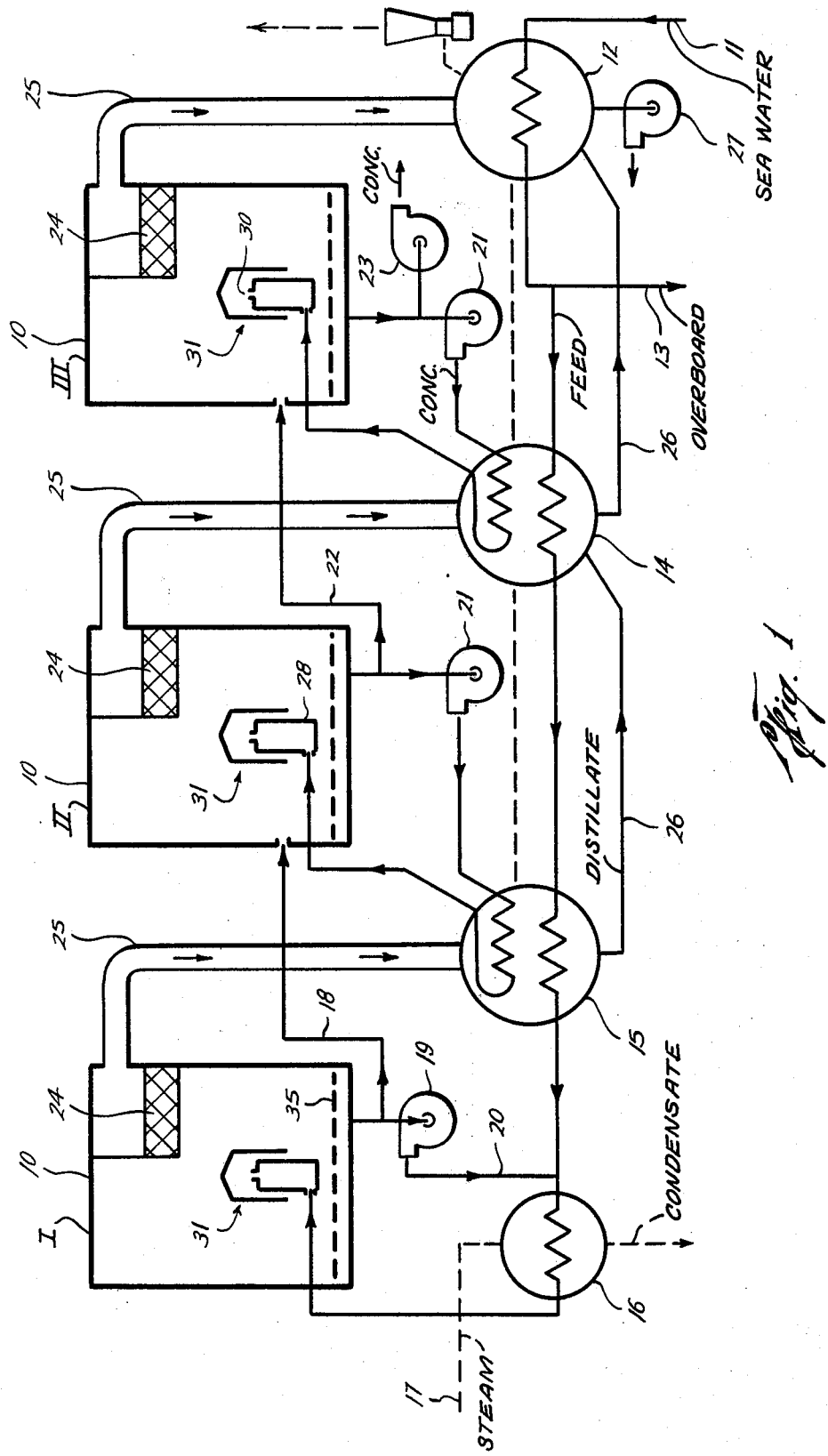
FIG. 1 is a generalized schematic flow diagram of the preferred embodiment of the invention.

Referring now to FIG. 1, there is schematically shown a three effect flash evaporator system. While the invention will be discussed with reference to this specific preferred embodiment, it will be understood that the invention is applicable to other flash evaporator arrangements including those having varying numbers of effects. Also, the interconnections between the effects can take various forms and combinations. At any rate, FIG. 1 illustrates three vessels 10 (which can be three compartments within a single vessel). The raw seawater enters at 11 to provide feed for evaporation, as well as for condensation and cooling of the distillate produced in the heat exchanger 12. Much of this raw water is discharged at 13; however a portion is directed to heat exchangers 14 and 15 where the raw feed water is further heated by condensation of the distilled steam from effects I and II. Final heating of the raw seawater takes place in steam heater 16 by heat exchange with steam from line 17.

The superheated feed is then introduced into effect I where the pressure and corresponding boiling point is significantly lower than the temperature of the feed (for example, 20° to 35° F. lower). The water boils instantly, flashing partially to steam. Not all of the feed water flashes, however, since vaporization causes the temperature of the feed to decrease to the boiling point of the pool of water in the bottom of the vessel. The remaining feed is withdrawn and a portion passed via line 18 into effect II. The remainder is mixed with the incoming feed by pumping it with pump 19 into line 20 and thence into the raw feed line for heating and recycling to the first effect. Similarly, the unflashed water in effects II and III is withdrawn and pumped by pumps 21 through heat exchangers 14 and 15, respectively, wherein the water is heated and recycled to effects II and III, respectively, for further flashing. A portion of the withdrawn water is passed via line 22 from effect II to effect III and a portion of the water from effect III is pumped by pump 23 to waste.

The flashed steam from effects I, II and III is passed through demister pads 24 and then through lines 25 to the respective heat exchangers 12, 14 and 15 wherein it is condensed. The resulting distillate passes via lines 26 to a pump 27 and thence to storage.

While the demister pads are shown in the drawing, other demisting devices can be used, singly or in combination.

As indicated above, the degree of superheat of the water to be flashed in each stage is substantially high, preferably of the order of 20° to 35° F. for example. In order to permit the resultant violent flashing while at the same time contain the flashing mixture in a small local region in vessels 10 and causing it to separate into steam with tolerable entrainment, a preheated seawater inlet header 28 is provided in each of the vessels 10 to extend at least partially across the vessels. Thus the preheated seawater is introduced into header 28 (FIG. 2) via a line 29 and the header is provided with a plurality of upwardly directed restricted discharge means such as orifices 30. It will be noticed that these orifices are in an upper portion of the header and spaced therealong.

Means are provided forming a flash chamber into which the water from the orifices is discharged. The flash chamber is indicated generally at 31 and has an upper dome 32 and sidewalls 33, the latter extending downwardly on both sides of the header and forming flow passages 34 therewith. The flash chamber need not be "domed" but can have a flat top.

It will be noted that the flash chamber and header are located at a level below that of the mist eliminator 24 in the preferred embodiment.

With the foregoing arrangement, the superheated water discharges from orifices 30 to be flashed within the flash chamber 31. The latter contains the violently expanding flashing mixture to be within the flash chamber until such time as most of the flashing has occurred. Also, the steam and unflashed water will pass downwardly through passages 34 with some of the water running down inside surfaces of walls 33 and the outside surfaces of water header 28. Thus the totality of this mixture is directed downwardly at a relatively high velocity (steam velocity of 20 to 100 feet per second) so that the droplets and slugs of water are directed down onto the top of the water surface of the body of water 35 in the bottom of vessels 10. At the same time, the downwardly flowing steam in passages 34 is discharged therefrom and must thereafter substantially change its flow direction in order to pass upwardly to the mist eliminator. Preferably, the arrangement is such that this steam changes its direction about 180° so as to obtain the maximum separation of water droplets and slugs therefrom and the spatial relationship of the flashing device and the mist eliminator will be determative of the degree of change of direction of flow of the steam. Preferably the flashing device is located as low as is permissable in vessel 10 so that the steam will not only change its direction substantially but will also have a maximum flow path to the mist eliminator to allow further dropping of entrainment therefrom. Also the flash device can be designed to occupy a small portion of the evaporator vapor space as is possible so the upward velocity of the discharged steam will be low and hence a lesser number of drops of water will be carried to the mist eliminator.

Figure 2:
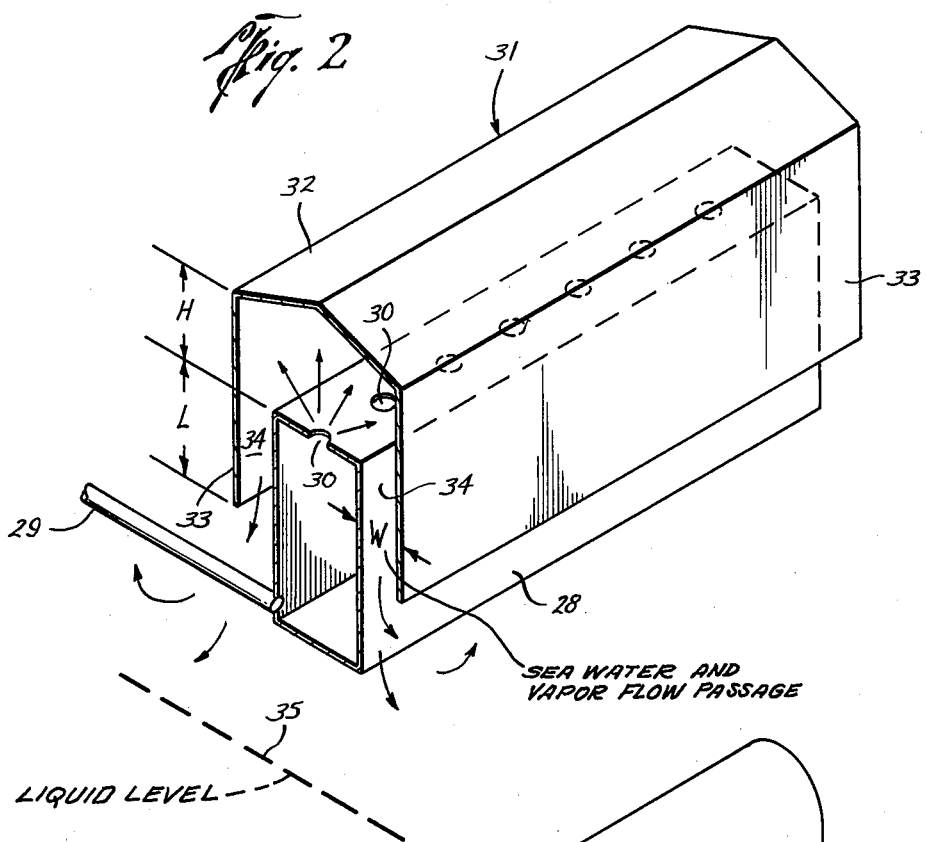
FIG. 2 is a view of the preferred form of a flashing arrangement.

In the preferred configuration of FIG. 2, the width W of passages 34 should be such that the steam flow velocity out of the flash device should be between 20 and 100 feet per second. A velocity in this range will give sufficient impetus to the unflashed water such as to cause most of it to continue downwardly and fall upon the surface of the body of water 35. The length L of passageways 34 should be at least twice their width and preferably three to four times their width. Thus, adequate length is provided to accelerate the droplets or slugs of unvaporized water so as to assure their downward travel and minimize the amounts of entrainment in the steam after it leaves the device and begins its upward travel. After the steam leaves the device at a relatively high velocity, it will move through the interior of vessel 10 toward the mist eliminator at a much lower velocity. Therefore, since the water droplets leaving the device at a high velocity will have a substantial inertia to continue their downward movement, the substantial lowering of the steam velocity will tend to permit the droplets to continue their downward motion. The height H of the flash chamber above the top of the header should be at least two and one-half times the width W of the passages and preferably three to four times the width. This gives adequate room for the flashing to occur so that most of it will occur in the region above the header.

Figure 3:
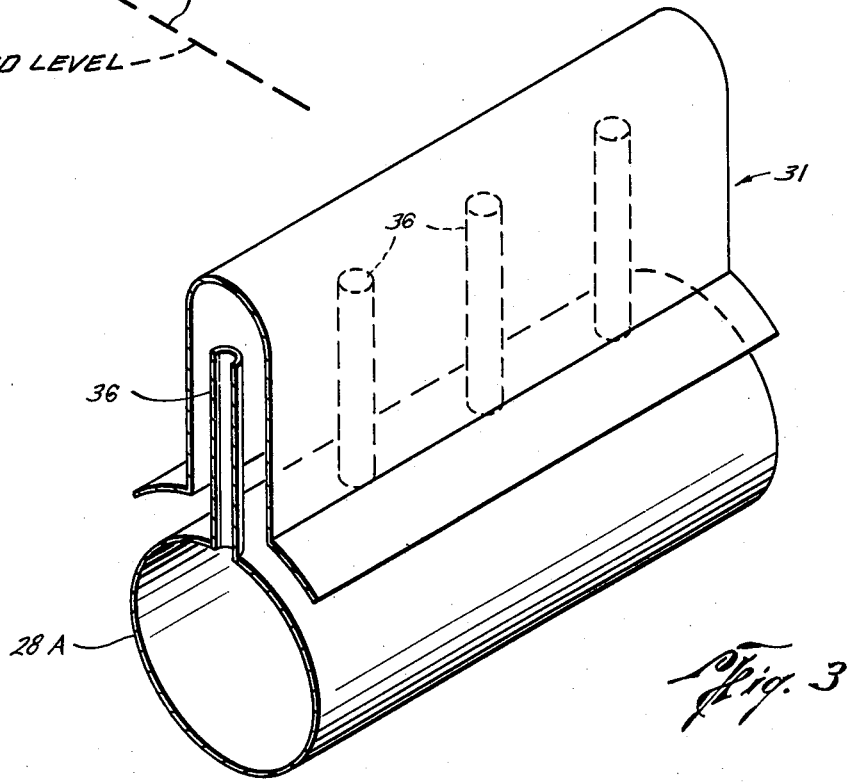
FIG. 3 is an alternate form of flashing arrangement.

An alternate but less preferred embodiment of the flash device is shown in FIG. 3. In this device the header 28A is a round pipe. The upwardly directed restricted discharge means is shown as a plurality of pipe nipples 36 which discharge into the flash chamber 31.

The invention having been described, what is claimed is:

1. In a multi-effect flash evaporator system wherein means are provided for preheating water and then flashing same into a vessel to provide steam and unflashed water and wherein a mist eliminator is provided through which the flashed steam passes to thereafter be condensed as distilled water, the improvement in combination therewith of a preheated water inlet header extending horizontally and at least partially across said vessel and including a plurality of upwardly directed restricted discharge means spaced along the header for discharging upwardly from the header the preheated feedwater which is to be flashed, and means forming a flash chamber comprising a roof for receiving the upwardly discharged water from said discharge means, said flash chamber extending along and generally above said discharge means and having substantially imperforate side walls which extend downwardly on both sides of the header and forming flow passages therewith so that flashed steam as well as unflashed water is directed to flow downwardly through said flow passages, said means forming a flash chamber being disposed at a level below that of the mist eliminator so that steam flowing down through said passages must substantially change its flow direction in order to pass upwardly to said mist eliminator.

2. The evaporator of claim 1 wherein said restricted discharge means are orifices.

3. The evaporator of claim 1 wherein said restricted discharge means are pipe nipples extending up into the flash chamber.

4. The evaporator of claim 1 wherein said header has a portion which invertical cross-section is rectangular or square and wherein the walls of the flash chamber extend down along the walls of the conduit so that the passages formed therewith are at least twice as long as they are wide.

5. The evaporator of claim 4 wherein the top of the flash chamber is spaced above the top of the conduit a distance at least 2.5 times the width of said passages.

* * * * *